Sept. 30, 1941.   S. OLSON ET AL   2,257,512
AUTOMATIC LOADING AND DELIVERY MECHANISM FOR CONVEYERS
Filed June 29, 1939   6 Sheets-Sheet 1
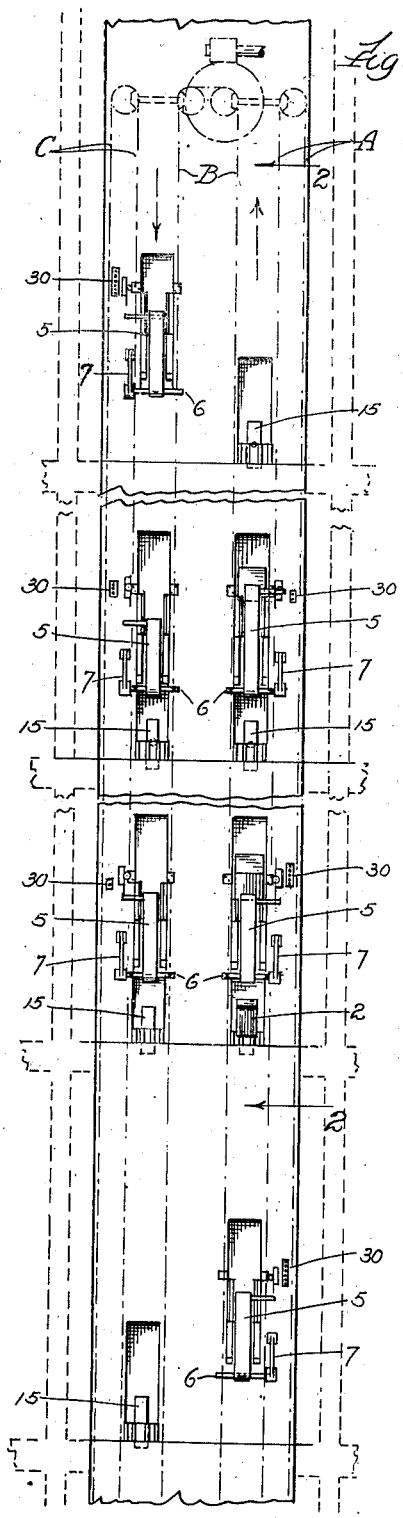
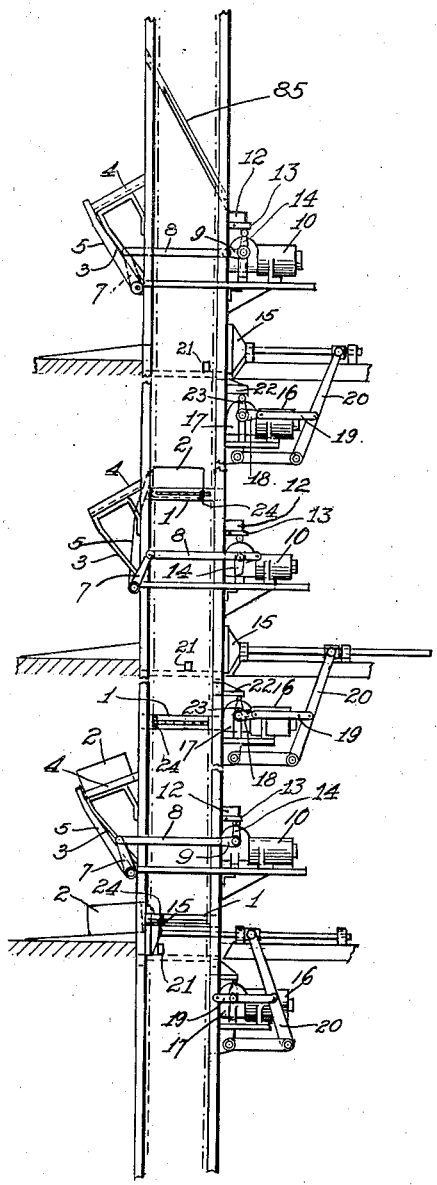
Inventors
Samuel Olson
and Percy E. Lenfestey
by [signature] Attys.

Sept. 30, 1941. S. OLSON ET AL 2,257,512
AUTOMATIC LOADING AND DELIVERY MECHANISM FOR CONVEYERS
Filed June 29, 1939 6 Sheets-Sheet 2

Inventor
Samuel Olson
and Percy E. Lenfestey
by Burton & Burton Atty's.

Witness
N.D. McKnight.

Sept. 30, 1941.  S. OLSON ET AL  2,257,512
AUTOMATIC LOADING AND DELIVERY MECHANISM FOR CONVEYERS
Filed June 29, 1939  6 Sheets-Sheet 4

Sept. 30, 1941.  S. OLSON ET AL  2,257,512
AUTOMATIC LOADING AND DELIVERY MECHANISM FOR CONVEYERS
Filed June 29, 1939  6 Sheets-Sheet 6

Inventors
Samuel Olson
and Percy F. Lenfestey

Patented Sept. 30, 1941

2,257,512

UNITED STATES PATENT OFFICE 2,257,512

AUTOMATIC LOADING AND DELIVERY MECHANISM FOR CONVEYERS

Samuel Olson and Percy E. Lenfestey, Chicago, Ill., assignors to Samuel Olson Mfg. Company, Inc., Chicago, Ill., a corporation of Illinois Application June 29, 1939, Serial No. 281,918

9 Claims. (Cl. 214—11)

This invention relates to conveyers which handle loads in unit packages or in container units of substantially uniform size. It is illustrated as applied to a continuously traveling vertical conveyer or elevator, and one object is to provide means for automatically placing the load unit upon the elevator, together with means capable of automatically delivering the load at any one of several stations. Another object is to provide adjustable trip means on the elevator, which is temporarily assigned to a particular load and is manually set to operate the delivery mechanism at a selected station. Preferably, the manual setting of the trip means is arranged to operate control devices which set in motion the loading mechanism. Preferably, also, the system includes such loading mechanism as well as delivery mechanism at several stations; hence, it is a further object of the invention to provide safety devices adapted to prevent interference between loads already on the elevator and loads about to be placed upon it.

The invention consists in certain features and elements of construction, in combination, as herein shown and described and as indicated by the claims.

In the drawings:

Fig. 1 is a front elevation of a conveyer system embodying this invention, with certain parts shown diagrammatically and with portions broken out to condense the view.

Fig. 2 is a side elevation on the same scale as Fig. 1, and showing corresponding portions of the system and looking in the direction of the arrows 2—2 on Figure 1.

Figures 3, 4:
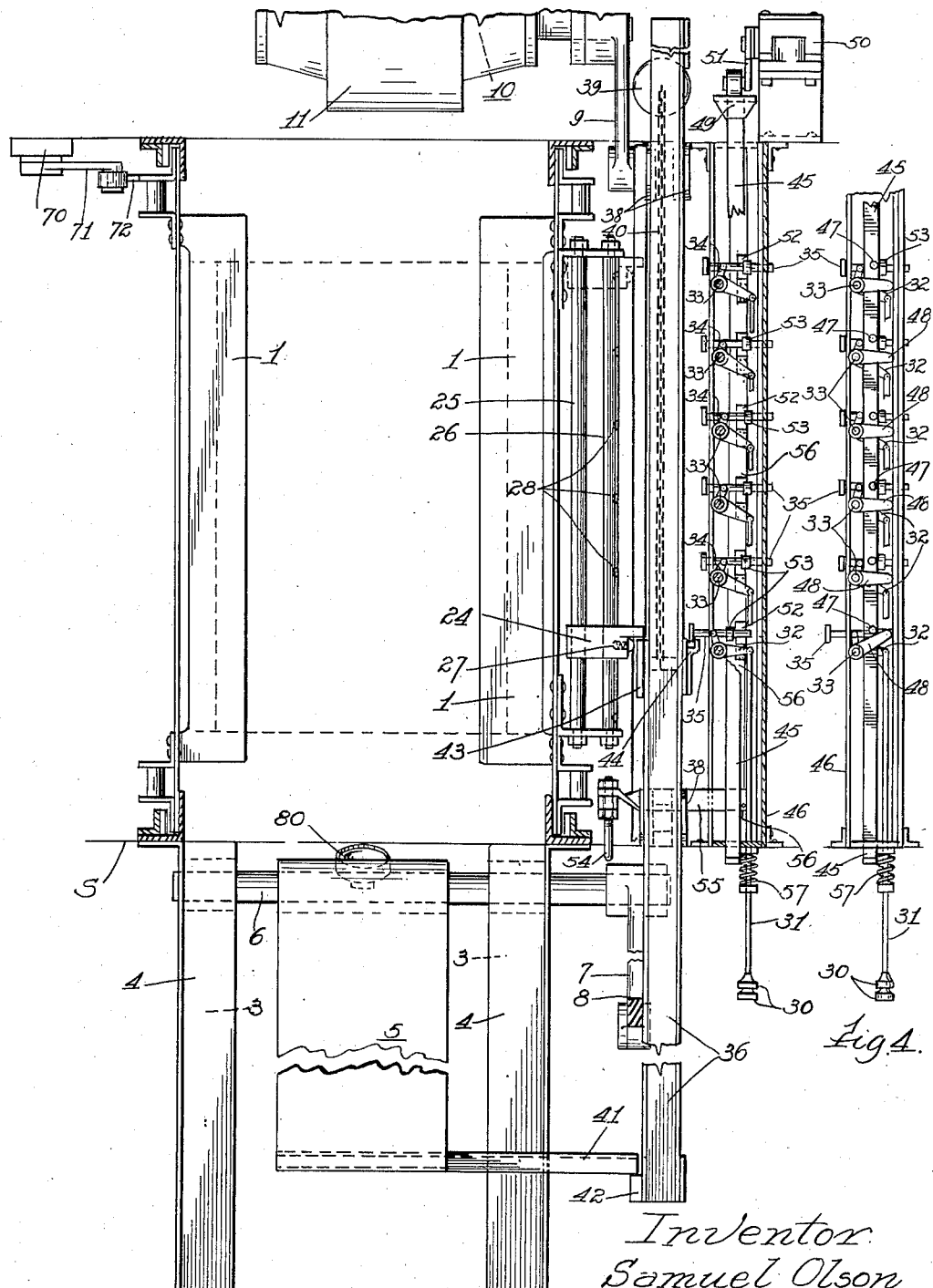
Fig. 3 is a sectional plan view on a larger scale and taken at a horizontal plane just above the mechanism of a loading station.
Fig. 4 is a detail plan view taken substantially at the plane indicated at line 4—4 on Fig. 6.

The elevator shown in the drawings with this invention applied thereto is of the type which comprises vertically traveling chains or belts spaced apart to provide a load-receiving space between them, and having load-supporting flights mounted at intervals on the chains or belts and projecting toward each other into the space to extend under the marginal portion of the load-carrying boxes or trays or other load units which are to be moved by the elevator. As indicated in Figs. 1 and 2, the system includes a pair of endless chains A, A, a second pair of chains B, B, and a third pair of chains C, C, all provided with suitable supporting and driving means, and guided for continuous travel along parallel paths. The upwardly moving plies of chains A, A are directly opposite the upwardly moving portions of chains B, B so that, together, these chains comprise the upwardly traveling conveyer. The downwardly moving portions of chains B, B extend in a plane facing that of the downwardly traveling plies of chains C, C; hence, they serve as the downwardly traveling conveyer. The chains of each pair are connected by horizontal flights 1 in the form of metallic angle rails onto which the load-carrying boxes 2 may be slid while the chains are in motion, and from which they may be slidably discharged by delivery mechanism upon reaching their destinations.

As seen in Figs. 1 and 2, each loading mechanism is provided with a stationary rest comprising a frame 3 with parallel guide rails 4 upon which the load unit or box 2 is placed manually in readiness for loading onto the elevator. A pusher arm 5, fulcrumed at its lower end at 6, engages one end of the load so that when the arm is swung toward the elevator the load is pushed onto a pair of the supporting flights 1 as they come into registration with the loading mechanism. The pusher arm 5 is rigidly connected with a lever arm 7 arranged to be operated through a link 8 attached to a crank arm 9 which is driven by a motor 10 through suitable gearing, not shown, but which may be understood as enclosed in the casing 11. A so-called limit switch 12 in the motor circuit, has an operating arm 13 extending for engagement with a trip arm 14 fixed on the shaft of the crank 9 and this trip member normally serves to open the motor circuit when one revolution of the crank 9 has been accomplished, thus producing one complete inward and outward movement of the pusher arm 5 of the loading mechanism. Preferably, the guide rails 4 upon which the load unit rests while awaiting transfer to the flights 1 of the elevator, are inclined upwardly toward the elevator so that there is no danger that the load will slide into the elevator shaft by gravity, and the timing of its transfer will be controlled by the operation of the pusher arm 5.

At each floor or station at which loads are to be discharged from the elevator there is provided a delivery or discharge mechanism, and it is a feature of this invention that as a load is deposited on the elevator a trip device is adjusted for operating the delivery mechanism at the selected floor or station at which that particular load is to be discharged. The delivery mechanism itself is comparatively simple, consisting of a pusher member 15 mounted for horizontal reciprocation across the elevator shaft, and arranged to be propelled in such movement by a motor 16 operating through a reduction gear whose housing is indicated at 17, with a crank arm 18 extending therefrom and connected by a link 19 to a lever 20 which engages a portion of the pusher 15. The motor 16 is controlled by a switch 21 whose actuation starts the pusher 15 across the elevator shaft in a direction to discharge a load unit 2 from the flights 1 which are, for the moment, registered with the pusher 15. After a single revolution of the crank arm 18 the movement of the pusher 15 is arrested by means of a limit switch 22 in the motor circuit, which is opened by a trip member 23 carried on the same shaft as the crank arm 18. It may be understood that any suitable circuit, to accomplish such operation, may be employed.

Figure 6:
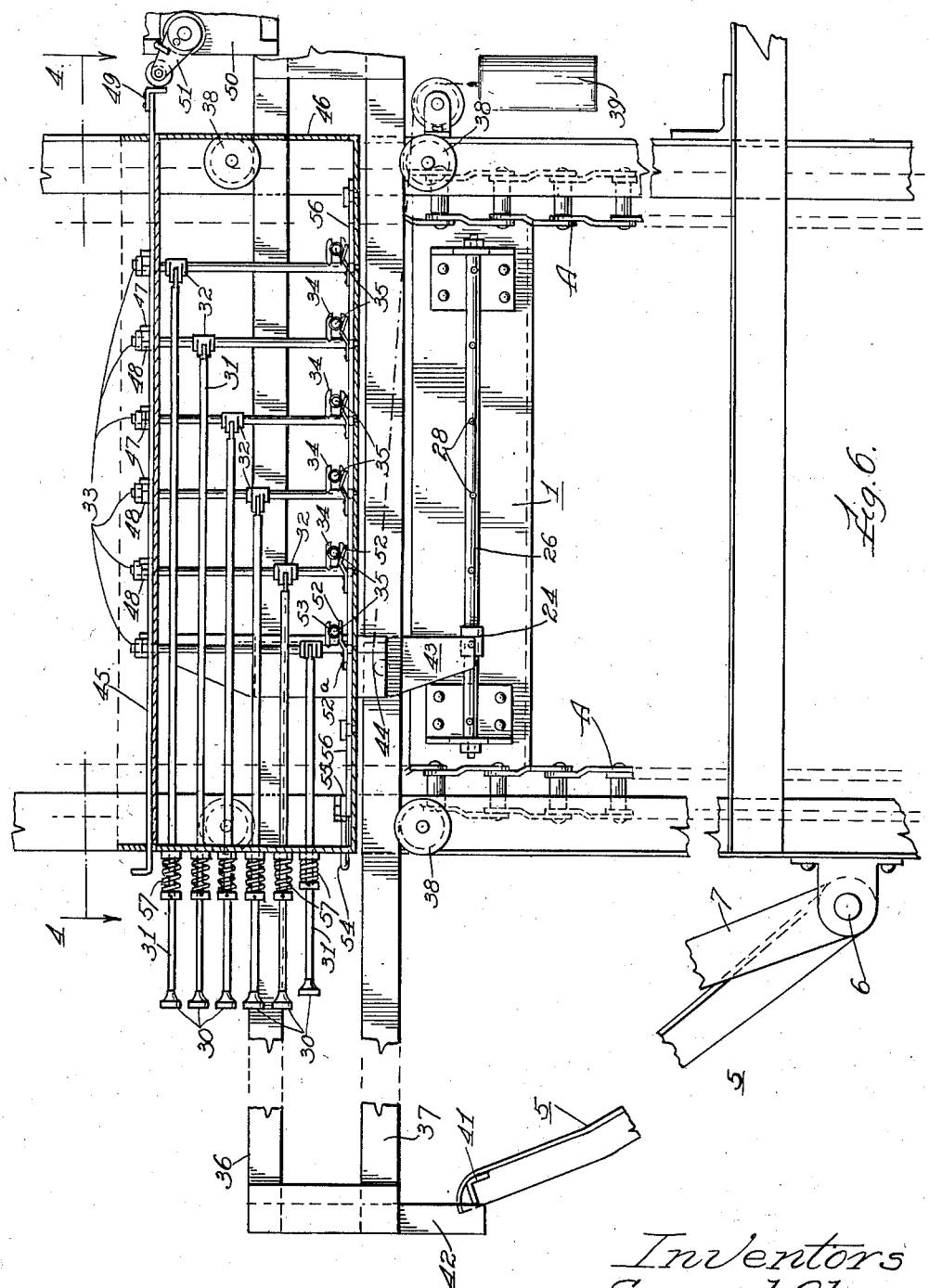
Fig. 6 is a side elevation, partly in section, taken as indicated at line 6—6 on Fig. 5.

For actuating the switch 21 one of the flights 1 which carries the load 2 is equipped with a trip member 24 slidably carried on guide rods 25 and 26 which are attached to the vertical leg of the flight angle 1 as seen in Figs. 3 and 6. The trip member 24 includes a spring-pressed detent at 27, which is engageable with any one of a series of notches 28 in the guide rod 26 for holding the trip member definitely at a selected position.

At each loading station there is provided a set of selector buttons 30 each corresponding to one of the delivery stations, and each carried on a push rod 31 which operates the crank arm 32 of a rock shaft 33. This shaft carries a second arm 34 which engages the stem of a transversely slidable stop 35. The stops 35 corresponding to the respective push-buttons 30 are disposed at different distances inwardly from the front face of the elevator from which the buttons 30 project. As shown in Figs. 3 and 6, a shifter carriage is mounted for horizontal movement alongside the elevator shaft in a plane between the stops 35 and the path of travel of the trip member 24. This carriage consists of upper and lower members 36 and 37 disposed between suitable guide rollers 38 and adapted to be drawn inwardly with respect to the face of the elevator shaft by means of a weight 39 and a chain 40. But the shifter is normally restrained against such movement by an arm 41 projecting laterally from the pusher arm 5 of the loading mechanism, and engaging an abutment 42 on the outer end of the shifter member 36. When the loader mechanism is set in operation the inward movement of the pusher arm 5 carries with it the arm 41 and permits inward travel of the shifter member 36. The shifter carriage includes a plate 43 having a vertically extending face which is engageable with the trip member 24 if the flight 1 on which the latter is carried is passing the shifter carriage at the moment, and the operation of the loader mechanism is so timed that this will always be the case. The part 43 extends vertically for a considerable distance to maintain such contact for a sufficient time to permit the inward movement of the shifter carriage to accomplish the adjustment of the trip member 24 to a position on its guide 26 corresponding to the delivery station which is the destination of the load being transferred at the moment onto the moving flight 1 with which this particular trip member 24 is associated. On the opposite side of the shifter carriage there is secured a stop lug 44 in position to encounter whichever one of the stops 35 has been projected into its path by the operation of a push-button 30 and such encounter limits the inward travel of the shifter 36 thereby determining the position at which the trip member 24 will be left as the flight 1 passes out of registration with the selector mechanism just described.

Figure 7:
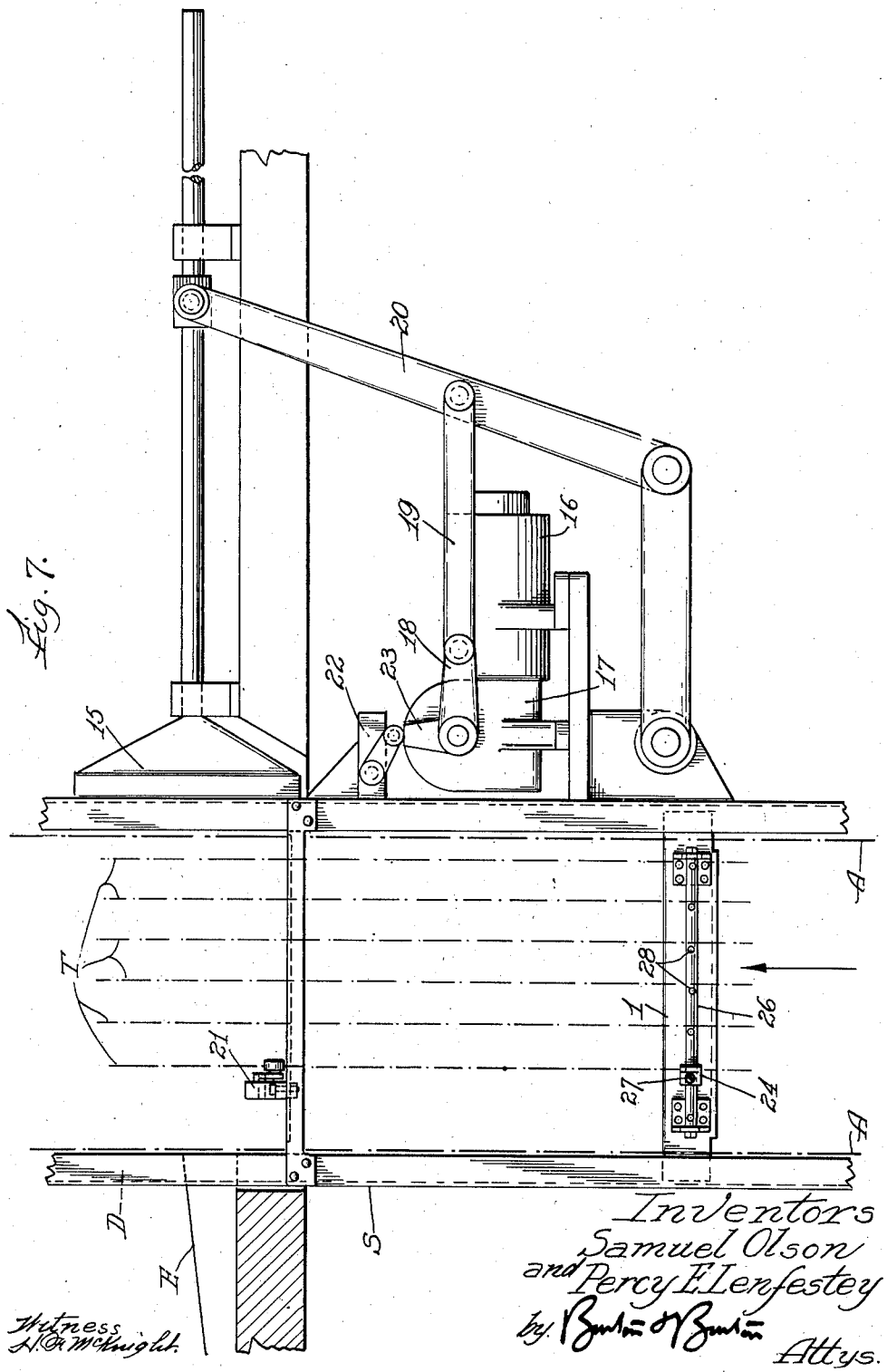
Fig. 7 is a side elevation of the delivery mechanism at one station of the elevator.

At the respective delivery stations the control switches 21 are disposed at various distances inwardly from a base line, such as the front face of the elevator shaft, indicated at S, so that each of them registers with a vertical line T (see Fig. 7), corresponding to some one position at which the trip member 24 may be adjusted on its notched guide rod 26. Thus the position at which the trip member 24 is placed by the shifter determines the station at which the load will be discharged, because upon arrival at the station whose switch 21 is aligned with the position of the trip 24 the trip will operate that switch, which, in turn, will start the motor 16 and the delivery pusher 15 for sliding the load from the supporting flights 1 and out of the elevator shaft. A suitable delivery opening D is provided at each such station, and, if desired, an inclined skidway E may be associated with such opening to receive the load as it emerges from the elevator shaft.

Returning to the consideration of the loading station and the selector mechanism, it may be noted that a slide bar 45 extends parallel to the push rods 31 at the top of the casing 46 which houses most of the selector mechanism, and this slide bar 45 carries a series of upstanding pins 47 each adjacent one of the rock shafts 33. Each of said shafts 33 has rigid with it a third rocker arm 48 which is swung when the shaft is rotated by operation of the corresponding push-button 30. A swing of the arm 48 which normally stands in engagement with a pin 47 of the slide bar 45 causes inward movement of the bar 45 so that its terminal shoe 49 operates the arm 51 of a switch 50 which is connected in the feed circuit of the motor 10 and serves to start said motor as soon as other necessary conditions are fulfilled, as will be hereinafter more fully explained.

When one of the buttons 30 has been pressed so as to rock the corresponding shaft 33 and project the stop 35, the latter is automatically retained in projected position by a flat spring detent 52 which initially rests against a collar 53 on the stem of the stop 35; when the stop 35 is projected the collar 53 is shifted out of registration with the spring 52 and the latter snaps past the collar and against the stem of the stop, thus preventing return movement of the stop 35 for the time being. As the pusher arm 5 approaches the limit of its swing toward the elevator shaft, the extension arm 41 which it carries collides with a projecting pin 54 which is carried rigidly by an arm 55 extending from a slide bar 56 on which all the detent springs 52 are mounted. As seen in Fig. 6, the horizontal portion of each spring 52 which engages the flat face of the collar 53 is offset from the base portion 52ᵃ of the spring by which it is secured to the slide bar 56; thus a slight movement of the bar 56 in the direction of its length, will carry all the springs 52 out of registration with the collars 53 and will release the particular stop 35, which has been held in operative position by its spring 52; and this release of the stop is accomplished at the end of the loading stroke, by which time the trip member 24 will have been adjusted to the desired position, and will have passed the vertically extending member 43 of the shifter carriage. The return of any stop 35 to its normal position is insured by the provision of return springs 57 on the push-rods 31 so that, instantly upon release from the spring 53, the stop resumes its normal position, and, presently, as the pusher 5 and its arm 41 commence their return swing to initial position, the pin 54 is released so as to permit the slide bar 56 to return to normal position, and thus carry the detent springs 52 back to their operative positions with respect to the several stops 35.

This return movement of the selector mechanism includes a swing of the rocker arm 48 back to normal position, thus permitting a return movement of the slide bar 45 and the release of the switch arm 51 which may be understood as having a spring return embodied in its associated mechanism. Although the switch 50 is thus opened, the driving motor 10 of the loader mechanism is not arrested at this stage, because the circuit is maintained by the supplemental limit switch 12. After the motor 10 has been started by the closing of its circuit through switch 50 the trip arm 14 on the shaft of crank 9 swings away from the operating arm 13 of the limit switch 12 and permits that switch to close for maintaining the motor circuit until a full revolution of the crank 9 has been performed. At the completion of this single turn of the crank 9 the trip arm 14 again engages the operating arm 13 and opens the limit switch 12 thus arresting the motor 10.

Figure 5:
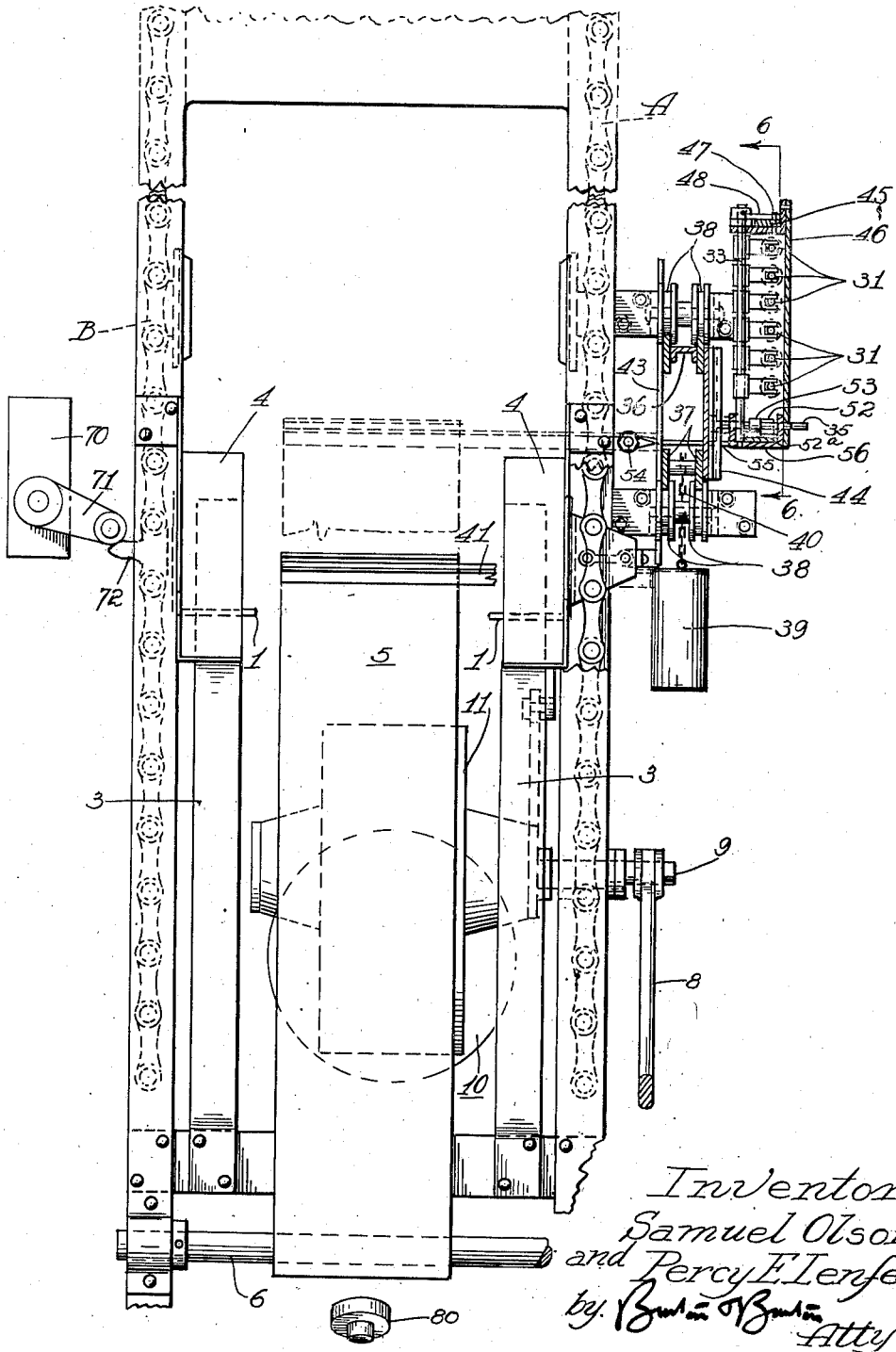
Fig. 5 is a front elevation, partly in section, showing the selective trip-setting devices as associated with the loading mechanism.

The operation of the loading motor 10 depends upon two additional switch devices which are included in the circuit. In order that the loading movement shall commence in properly timed relation to the approach of a pair of flights 1, 1 so that these flights shall be correctly positioned to receive the load as it is pushed into the elevator shaft by the pusher arm 5, a switch 70 is mounted adjacent the elevator shaft with its arm 71 in position to be actuated by a lug 72 associated with one of each pair of flights. For convenience, the lug 72 may be carried at the opposite side of the elevator from the trip device 24 and it is so shown in Fig. 5, but it may be understood that this structure may be associated with the chains at either side of the elevator. The switch 70 being positioned in proper vertical relation to the upper ends of the inclined rest rails 4, 4 it will thus function to close the motor circuit at the moment when the flights 1, 1 are closely approaching the level of said rest rails. A further condition to satisfactory operation is that the approaching flights 1, 1 shall be empty, and thus available for receiving a load from the rest rails 4, 4. To insure this condition, a detector device is located at each loading station. This may be of any suitable character, and is illustrated as of the type commonly known as "electric eye," which comprises a light-sensitive cell, which is associated with a suitable relay or other switch-actuating mechanism. This unit, including switch mechanism in the motor circuit, is shown at 80, being located adjacent the elevator shaft and in position to receive a beam of light 82 from a suitably focused lamp 81. This beam is directed across the shaft so as to be intercepted by a load carried by the flights as they approach the loading station in question, and it may be understood that if the beam of light from the lamp 81 is interrupted, the switch mechanism at 80 will hold the motor circuit open, thus preventing the loading motor from starting at this time. The loaded flights having passed, the switch 70 will return to open position (its arm 71 being spring-actuated in that direction by any suitable spring, not shown), and the motor circuit will thus remain open until the next pair of flights arrives at suitable position to receive a load from the rest rails 4. If this next pair of flights is empty, the beam of light from the lamp 81 will be uninterrupted, and the switch at 80 will remain closed, while the switch 70 is closed by the actuating lug 72. The switch 50 having been closed by actuation of one of the push-buttons 30 (and through the medium of the slide bar 45) the motor circuit will be completed, and the loading motor will commence operation.

Thus, in a building equipped with an elevator system embodying this invention, it is possible to transport loads or load units from one floor to any other floor without requiring a freight elevator or an attendant to operate it; and since the system includes continuously traveling elevators in both upward and downward directions, there is very little time lost in sending a load on its way. When a load unit has been placed on the rest rails 1, at any floor, and one of the buttons 30 has been pressed to determine the destination of the load, it will be automatically shifted onto the elevator upon the arrival of the first available pair of flights, and the transfer will be made without halting the elevator and thus delaying delivery of other loads which it is carrying.

Beyond the uppermost station of the upwardly traveling conveyer, and beyond the lowermost station of the downwardly traveling conveyer, a cam rail 85 is provided extending obliquely across the path of the flights which carry the adjustable trip members 24; thus, as the flights pass the rail 85, other trip members 24 are all returned to initial position in readiness for further use. It may be understood that the mechanism already described with respect to the upwardly traveling elevator is applicable to the downwardly traveling portion of the system to which loads will be delivered automatically, and from which they will be discharged automatically by the setting of trip members 24 and their actuation of switches 21.

Figure 8:
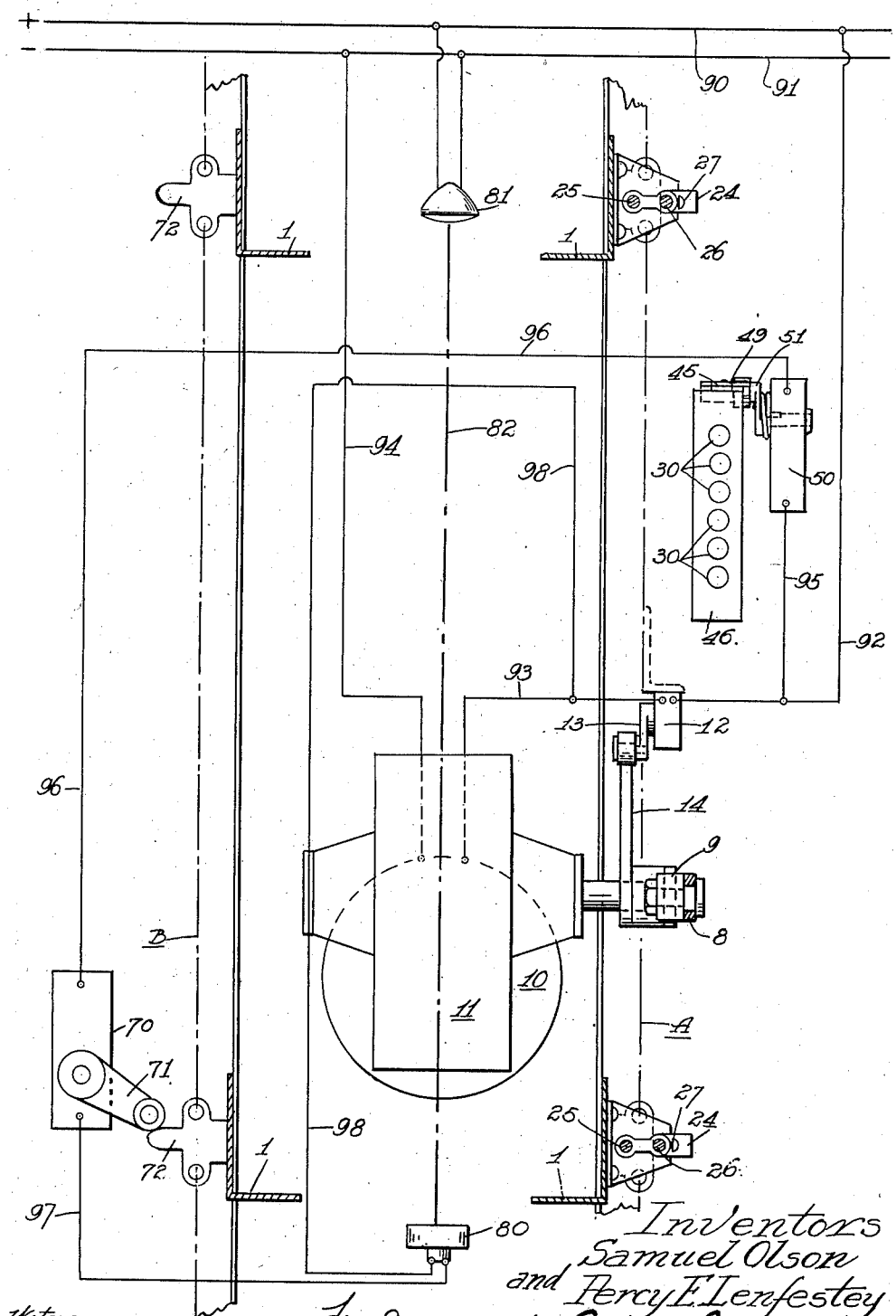
Fig. 8 is a wiring diagram for the loader mechanism at one station, showing certain associated elements of the mechanism in vertical section.

To clarify the arrangement of the several switches which control the loading action, Fig. 8 presents a comparatively simple wiring diagram in which the main feed wires are shown at 90 and 91, with a wire 92 extending from the feed wire 90 to the switch 12 which controls the motor 10 and normally stands at open position. From the switch 12 the wire 93 leads to the motor, and a return wire 94 extends from the motor to the other feed wire 91. This may be considered the normal driving circuit through which the current is furnished to the motor during most of the loading action.

But since the switch 12 stands normally at open position, a supplemental starting circuit is provided which consists of the wire 95 tapped into the wire 92 and extending to the switch 50 which is closed by the operation of one of the push-buttons 30 and actuation of the slide bar 45. From the switch 50 a conductor wire 96 leads to the switch 70 which is closed periodically by the movement of each pair of flights 1, 1 into position at which they register properly with the rest rails 4 for receiving a load therefrom. But from the switch 70 conductor 97 leads through the switch 80 which is normally held closed by the beam of light 82 from the light source 81 but which is opened by the presence of a load on the flights approaching the loading station. From the switch device 80 a conductor 98 is tapped into the conductor 93 thus completing a supplemental circuit bridged around the switch 12 so that upon the fulfillment of the three necessary conditions which cause the closing of switches 50, 70 and 80 the motor 10 can be started for commencing the loading operation. After the crank arm 9 has turned through a few degrees, the switch 12 will be permitted to close and will maintain the circuit for driving the loading mechanism through a complete revolution of the crank 9.

We claim:

1. In combination with an elevator having load-supporting flights at intervals, a loading station and a plurality of unloading stations with load discharge mechanism at each unloading station, a separate control device for each discharge mechanism located adjacent the corresponding station and adjacent the path of the flights, the several control devices being disposed at different distances from a fixed base-line extending in the direction of travel of the flights, and a trip member mounted on each of the flights which travel adjacent said control devices and adjustable transversely of the direction of travel into position for encountering and actuating any selected control device as the flight passes it, for effecting discharge of the load from that flight at the corresponding station, together with a shifter mounted at the loading station for movement transversely of said direction of travel and in engagement with any one of said trip members for setting it during its travel, and stop means adjustable at will to predetermine the stroke of the shifter and the consequent movement of the trip member to a selected position determining the destination of a load to be carried by the flight on which such trip member is mounted.

2. In the combination defined in claim 1, said shifter having a face extending parallel to the direction of travel of the flight for maintaining contact with the trip member as the flight travels through a limited distance.

3. In the combination defined in claim 1, an actuating member movable transversely of the direction of travel of the flights and provided with a one-way connection to the shifter, preventing movement of the shifter in its operative direction except when the actuator is operated, and yielding means urging the shifter in the direction of its operative movement, said actuator having a uniform stroke and the aforesaid stop means comprising a plurality of separate stops each adapted to be projected at a different point into the path of shifter movement, with manually operable means for projecting any selected stop to arrest the shifter during the actuator movement and thus adjust the trip member at a selected position.

4. In combination with an elevator as defined in claim 1, a loader mechanism at the loading station including means to support and move a load unit onto the flights of the elevator, such movement being transverse to the direction of travel of said flights, and means by which the movement of said loader mechanism controls operation of the said shifter, the stop means being adjustable to limit the shifter movement independently of the loader movement and in accordance with the position selected for the trip member.

5. In the combination defined in claim 1, a loader mechanism at the loading station and means by which the movement of the loader mechanism controls the operation of said shifter to effect the setting of the trip member on the flight on which the load is placed by said loader mechanism and for determining the station at which such load will be delivered.

6. In the combination defined in claim 1, a loader mechanism at the loading station including a part movable transversely of the direction of travel of the flights, and means normally urging the said shifter in the direction for engaging and moving any one of said trip members for setting it in position to actuate a selected control device, means on the loader mechanism inter-engaged with said shifter and serving to prevent such movement of a shifter except when the loader is operated to feed a load unit onto the elevator, said stop means being manually adjustable at will and in advance of the loading operation to limit the stroke of the shifter independently of the loader movement.

7. In the combination defined in claim 1, a loader mechanism at the loading station including means to support and transfer a load unit onto the elevator flights by movement transversely of the direction of elevator travel, means by which the movement of said loader mechanism controls the shifting, the aforesaid stop means comprising a plurality of separate stops each adapted to be projected into the path of shifter movement with manually operable means for projecting any selected stop to arrest the shifter independently of the loader movement and thus adjust the trip member at a selected position for determining the station at which a given load will be delivered.

8. In the combination defined in claim 1, a loader mechanism at the loading station, means on the loader inter-engaged with said shifter to prevent movement of the shifter except when the loader is operated in a direction transverse to the direction of elevator travel for feeding a load unit onto the elevator, said stop means being adjustable at will to limit the movement of the shifter independently of the loader movement, a motor connected to actuate the loader, a source of electrical energy in circuit with said motor and a switch in said circuit arranged to be closed by the adjustment of the stop means, whereby said adjustment and the resulting destination of the load unit is determined in advance of the loading operation and incidentally thereto.

9. In the combination defined in claim 1, a loader mechanism at the loading station, means on the loader inter-engaged with said shifter to prevent movement of the shifter except when the loader is operated in a direction transverse to the direction of elevator travel for feeding a load unit onto the elevator, said stop means being adjustable at will to limit the movement of the shifter independently of loader movement, a motor connected to actuate the loader, a source of electrical energy in circuit with said motor and a switch in said circuit arranged to be closed by the adjustment of the stop means, whereby said adjustment and the resulting destination of the load unit is determined in advance of the loading operation and incidentally thereto, together with an additional switch in the circuit of said motor, and a load detector including a light-sensitive device with a light beam extending across the path of loads on the elevator and focused upon said device, said light-sensitive device being arranged to operate the additional switch for opening the circuit when said beam is interrupted by the passage of a load on the elevator, whereby the loader is prevented from feeding a load to an already loaded flight.

SAMUEL OLSON.
PERCY E. LENFESTEY.